United States Patent
Goryachev et al.

(10) Patent No.: US 10,489,472 B2
(45) Date of Patent: Nov. 26, 2019

(54) CONTEXT-BASED SEARCH SUGGESTIONS ON ONLINE SOCIAL NETWORKS

(71) Applicant: Facebook, Inc., Menlo Park, CA (US)

(72) Inventors: Alexander Goryachev, London (GB); Ian Douglas Hegerty, Andover (GB); Nick In 't Ven, Maidenhead (GB)

(73) Assignee: Facebook, Inc., Menlo Park, CA (US)

( * ) Notice: Subject to any disclaimer, the term of this patent is extended or adjusted under 35 U.S.C. 154(b) by 203 days.

(21) Appl. No.: 15/430,960

(22) Filed: Feb. 13, 2017

(65) Prior Publication Data
US 2018/0232460 A1    Aug. 16, 2018

(51) Int. Cl.
G06F 17/30    (2006.01)
G06F 16/9535    (2019.01)

(52) U.S. Cl.
CPC ............... *G06F 16/9535* (2019.01)

(58) Field of Classification Search
None
See application file for complete search history.

(56) References Cited

U.S. PATENT DOCUMENTS

| | | |
|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,797,635 B1 | 9/2010 | Denise |
| 7,836,044 B2 | 11/2010 | Kamvar |
| 7,840,589 B1 | 11/2010 | Holt |
| 8,024,328 B2 | 9/2011 | Dolin |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,209,330 B1 | 6/2012 | Covell |
| 8,239,364 B2 | 8/2012 | Wable |
| 8,244,848 B1 | 8/2012 | Narayanan |

(Continued)

*Primary Examiner* — Debbie M Le
(74) *Attorney, Agent, or Firm* — Baker Botts L.L.P.

(57) ABSTRACT

In one embodiment, a method includes receiving, from a client system of a first user of an online social network, an indication that the first user has accessed a query field. The method also includes determining one or more content objects viewed by the first user in a current view session, accessing terms associated with one or more of the content objects, and ranking the terms based at least on a social-graph affinity of the first user with respect to the term. The method also includes sending, to the client system for display, instructions for generating a suggested-queries interface responsive to the indication the first user has accessed the query field, the suggested-queries interface including one or more suggested queries corresponding to one or more terms having a ranking greater than a threshold rank, respectively.

21 Claims, 7 Drawing Sheets

(56) References Cited

U.S. PATENT DOCUMENTS

| | | |
|---|---|---|
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,504,583 B1 * | 8/2013 | Ke .................... G06F 16/9535 707/767 |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,799,267 B2 * | 8/2014 | Milby .................. G06F 3/0613 707/713 |
| 8,799,276 B1 * | 8/2014 | Hyatt ............... G06F 17/30867 707/723 |
| 8,832,111 B2 | 9/2014 | Venkataramani |
| 8,868,590 B1 | 10/2014 | Donneau-Golencer |
| 8,868,603 B2 | 10/2014 | Lee |
| 8,886,836 B2 * | 11/2014 | Luu ................... G06Q 30/0251 709/246 |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 9,064,016 B2 * | 6/2015 | Shokouhi .......... G06F 17/30867 |
| 9,129,026 B1 * | 9/2015 | Hyatt ............... G06F 17/30867 |
| 9,153,000 B2 * | 10/2015 | Kazan .................. G06Q 10/101 |
| 9,436,957 B2 * | 9/2016 | Isaacson ............ G06Q 30/0633 |
| 9,483,518 B2 * | 11/2016 | Schechter ........... G06F 16/9535 |
| 9,773,063 B2 * | 9/2017 | Shi ...................... G06F 16/9535 |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2006/0218111 A1 | 9/2006 | Cohen |
| 2007/0174304 A1 | 7/2007 | Shrufi |
| 2007/0192293 A1 | 8/2007 | Swen |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0222348 A1 | 9/2009 | Ransom |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0271374 A1 | 10/2009 | Korn |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082649 A1 * | 4/2010 | Gutt .................. G06F 17/30864 707/758 |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0250526 A1 | 9/2010 | Prochazka |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |

(56) References Cited

U.S. PATENT DOCUMENTS

| | | |
|---|---|---|
| 2013/0124542 A1 | 5/2013 | Lee |
| 2013/0144899 A1 | 6/2013 | Lee |
| 2013/0151539 A1* | 6/2013 | Shi ..................... G06F 16/9535 |
| | | 707/754 |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0280080 A1 | 9/2014 | Solheim |
| 2014/0304429 A1 | 10/2014 | Softky |
| 2015/0074289 A1 | 3/2015 | Hyman |
| 2015/0149482 A1* | 5/2015 | Finkelstein ......... G06F 16/3338 |
| | | 707/748 |
| 2015/0161519 A1 | 6/2015 | Zhong |
| 2015/0286643 A1 | 10/2015 | Kumar |
| 2015/0363402 A1 | 12/2015 | Jackson |
| 2016/0026727 A1 | 1/2016 | Bar-Yossef |
| 2016/0041982 A1 | 2/2016 | He |
| 2016/0042067 A1 | 2/2016 | Weng |
| 2016/0063093 A1 | 3/2016 | Boucher |
| 2016/0063115 A1 | 3/2016 | Ayan |
| 2016/0162502 A1 | 6/2016 | Zhou |
| 2016/0203238 A1 | 7/2016 | Cherniavskii |

\* cited by examiner

CONTEXT-BASED SEARCH SUGGESTIONS ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may provide query suggestions based on the contents currently or recently visible on a user's screen. A user interface associated with the social-networking system may comprise fields for displaying one or more query suggestions associated with each search instance. Instead of typing in a search query into a query field, a user may conduct a search against the online social network by, for example, clicking on one of the query suggestions. The efficiency of searching may be improved if the displayed query suggestions are customized to fit the user's interests, such that the user's probability of using at least one of the query suggestions is increased. Typically, the social-networking system may provide query suggestions based on a variety of sources such as, for example, a search history associated with the querying user, content associated with the querying user, or a plurality of trending or popular topics on the online social network. However, the context of the user's current view session may provide additional information that can be used to create more relevant suggestions. A current view session is a currently active session between a client system and a social-networking system without having been terminated. In particular embodiments, the social-networking system may access the terms associated with the contents that a first user has viewed in a current view session on receiving an indication that a first user has accessed a query field. The social-networking system may rank the accessed terms based on various ranking criteria and then send the high ranking terms as query suggestions to the client system. For example, a user may scroll down through his newsfeed and may be currently viewing a post related to football such as a promotional video from the San Francisco 49ers football team with the text "Football season is about to start. Go 49ers!" If the user clicks on the search bar while he is viewing the post, then the social-networking system may provide a list of search suggestions related to terms associated with the post with the promotional video, including "Football", "NFL", "49ers", etc.

In particular embodiments, the social-networking system may provide query suggestions based on a character string that a user inputted and the contents currently or recently visible on the user's screen. The social-networking system may receive a character string imputed by a user in a query field and then access terms matching a character string where the terms are associated with the content objects that a user has viewed in a current view session. The social-networking system may rank the accessed terms based on various ranking criteria and then send the high ranking terms as query suggestions to the client system. The social-networking system may rank the terms based on, for example, a quality of matching of the respective term to the character string or one or more pre-determined ranking criteria.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
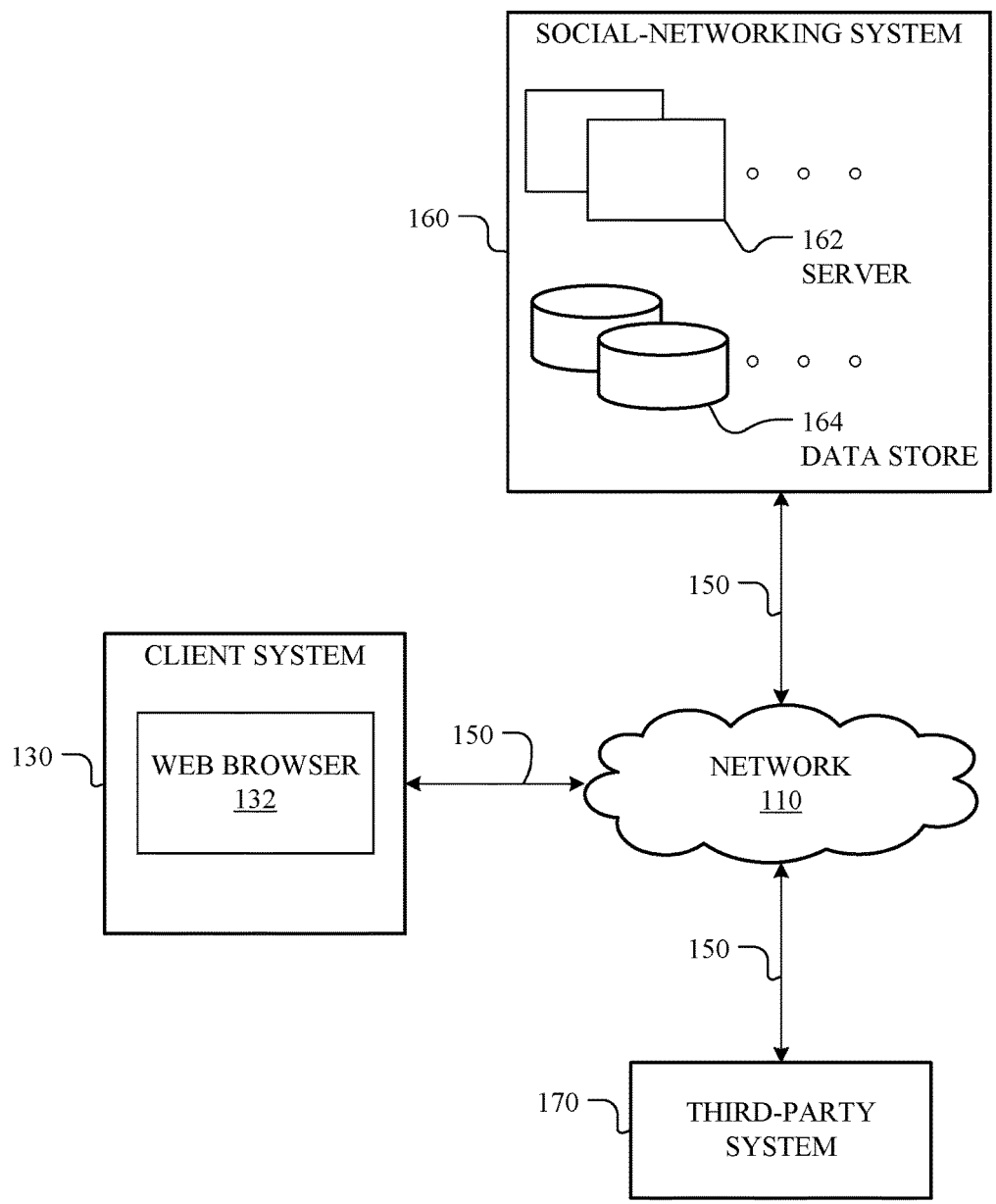
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories.

Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
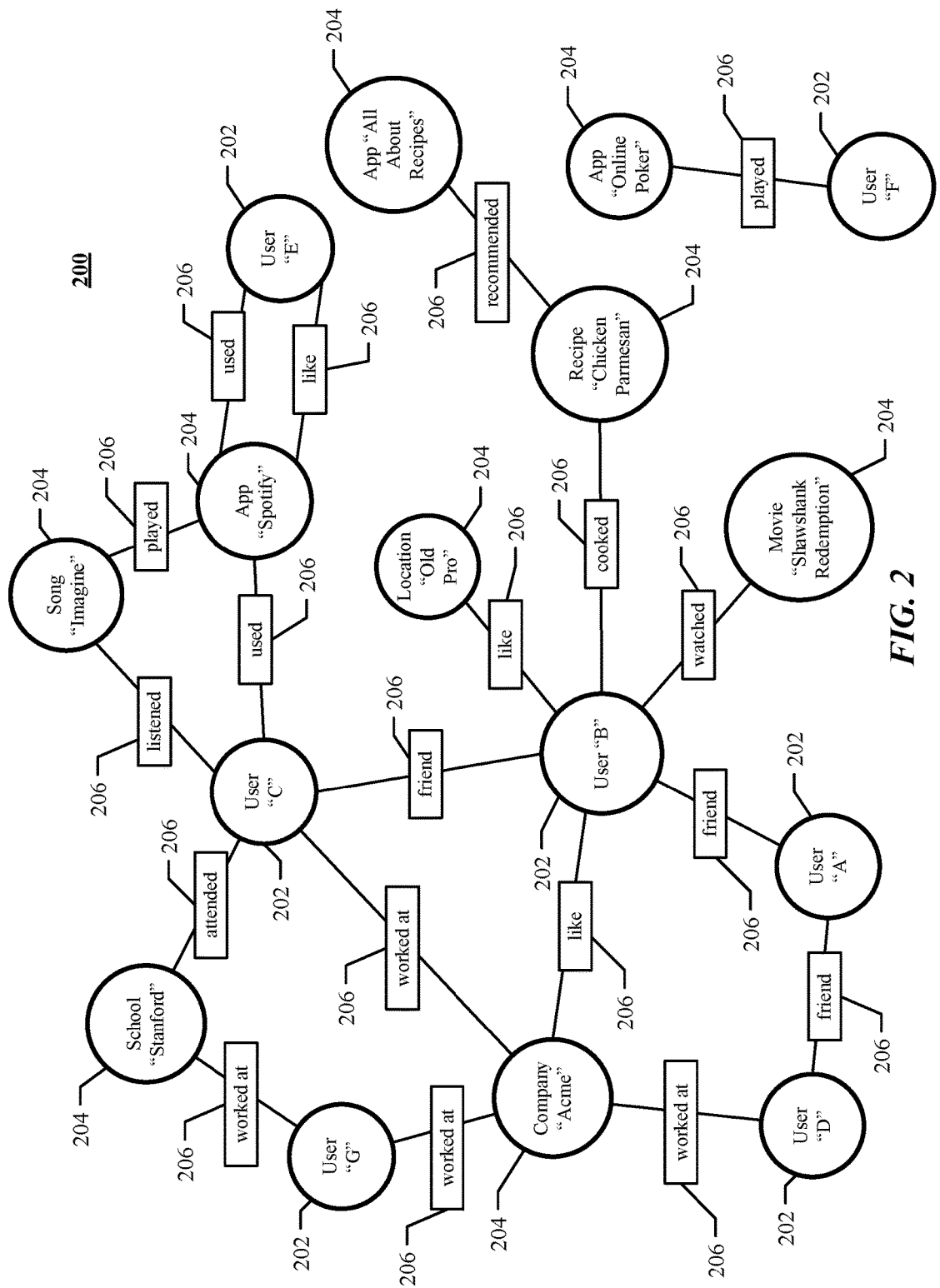
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JAVASCRIPT, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, the social-networking system 160 may receive, from a client system of a user of an online social network, a query inputted by the user. The user may submit the query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Indexing Based on Object-Type

Figure 3:
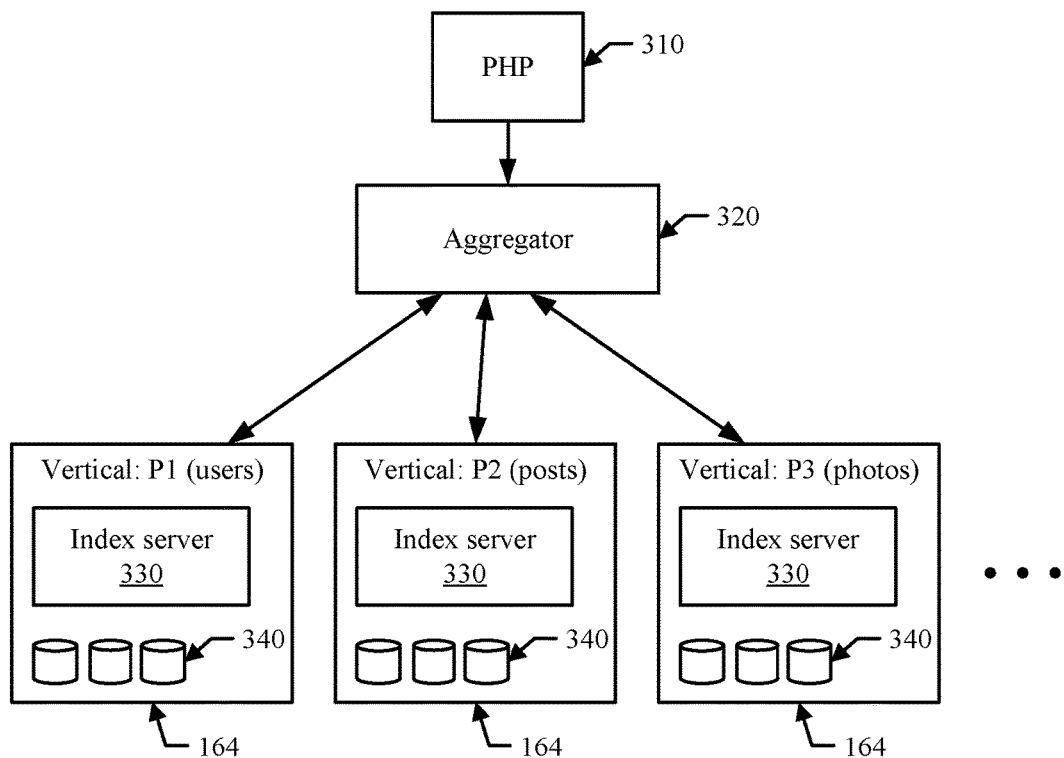
FIG. 3 illustrates an example partitioning for storing objects of a social-networking system.

FIG. 3 illustrates an example partitioning for storing objects of a social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a web interface, an application, a location, a user-profile interface, a concept-profile interface, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170). In particular embodiments, an aggregator 320 may be configured to receive the search query from PHP process 310 and distribute the search query to each vertical. The aggregator may comprise one or more computing processes (or programs) hosted by one or more computing devices (e.g. servers) of the social-networking system 160. Particular embodiments may maintain the plurality of verticals 164 as illustrated in FIG. 3. Each of the verticals 164 may be configured to store a single type of object indexed by a search index as described earlier. In particular embodiments, the aggregator 320 may receive a search request. For example, the aggregator 320 may receive a search request from a PHP (Hypertext Preprocessor) process 210 illustrated in FIG. 2. In particular embodiments, the search request may comprise a text string. The search request may be a structured or substantially unstructured text string submitted by a user via a PHP process. The search request may also be structured or a substantially unstructured text string received from another process of the social-networking system. In particular embodiments, the aggregator 320 may determine one or more search queries based on the received search request. In particular embodiments, each of the search queries may have a single object type for its expected results (i.e., a single result-type). In particular embodiments, the aggregator 320 may, for each of the search queries, access and retrieve search query results from at least one of the verticals 164, wherein the at least one vertical 164 is configured to store objects of the object type of the search query (i.e., the result-type of the search query). In particular embodiments, the aggregator 320 may aggregate search query results of the respective search queries. For example, the aggregator 320 may submit a search query to a particular vertical and access index server 330 of the vertical, causing index server 330 to return results for the search query.

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723, 861, filed 21 Dec. 2012, and U.S. patent application Ser. No. 13/870,113, filed 25 Apr. 2013, each of which is incorporated by reference.

Context-Based Search Suggestions

In particular embodiments, the social-networking system 160 may provide query suggestions based on content objects currently or recently viewed by a user. On receiving an indication that the user accessed a query field from a client system 130, the social-networking system 160 may determine one or more content objects the user viewed in a current view session. A current view session is a currently active session between a client system 130 and the social-networking system 160 without having been terminated. The client system 130 may establish a session with the social-networking system 160 using, for example, a web browser 132 or a native application associated with the social-networking system 160 (e.g., a mobile social-networking application, a messaging application, another suitable application or any combination thereof), either directly, via a network 110, or via a third-party system 170. The social-networking system 160 may access one or more terms associated with the one or more content objects. Terms associated with a content object may be generated and stored ahead of time, for example, when the content object is posted to the online social network. When the social-networking system 160 provides query suggestions, the social-networking system 160 may limit the number of query suggestions for various reasons: Screen real estate for query suggestions on the client system 130 may be limited. Also, the querying user may be overwhelmed if the social-networking system 160 provides too many query suggestions. A number of the one or more terms accessed by the social-networking system 160 may exceed the number of terms corresponding to the query suggestions that can be provided to the client system 130. The social-networking system 160 may rank the one or more terms to resolve this situation based on a variety of criteria, including, for example, social-graph affinity, social-graph information, local and/or global popularity as query terms, various social signals, term-matching confidence, other suitable criteria, or any suitable combination thereof. The social signals may include measures of user's interactions on the online social network with respect to particular content objects, such as, for example, a number of likes, reactions, comments, shares, other suitable interactions on online social networks, or any combination thereof. The term-matching confidence of a term to a given content object may be a level of confidence, measured by a confidence score, that the given term is actually intended text corresponding to the particular content object. The social-networking system 160 may send instructions for generating a suggested-queries interface to the client system 130 for display. The suggested-queries interface may comprise one or more suggested queries corresponding to one or more terms having a ranking greater than a threshold rank, respectively. The social-networking system 160 may apply various filters to the possible query suggestions. As an example and not by way of limitation, the social-networking system 160 may provide only query suggestions related to particular object-types (e.g., only people suggestions may be provided). As an example and not by way of limitation, a user may view a video of his friend eating a plate of oysters with a title "Eating oysters at Sea Shack" and then the user may click on the query field. In response to the user accessing the query field, the social-networking system 160 may provide query suggestions that are relevant to the video (e.g., "Sea Shack", "Seafood Restaurants Nearby", "The Oyster House Restaurant", "Oyster Season", "Oyster Types", which are terms related to the content objects viewed in the current view session) to the client system 130, for example, by presenting a suggested-queries interface that displays one or more of the query suggestions. These query suggestions may be presented to the user without the user typing any character in the query field (i.e., in the null state). As an example and not by way of limitation, continuing with the prior example, if the user types "oys" in the query field, then the social-networking system 160 may apply the inputted character string "oys" as a filter and provide only query suggestions that contain the inputted character string (e.g., "The Oyster House Restaurant", "Oyster Season", "Oyster Types", which are terms that match, at least in part, the character string inputted by the user). Although this disclosure describes providing particular query suggestions a particular manner, this disclosure contemplates providing any suitable query suggestions in any suitable manner.

Figure 4A:
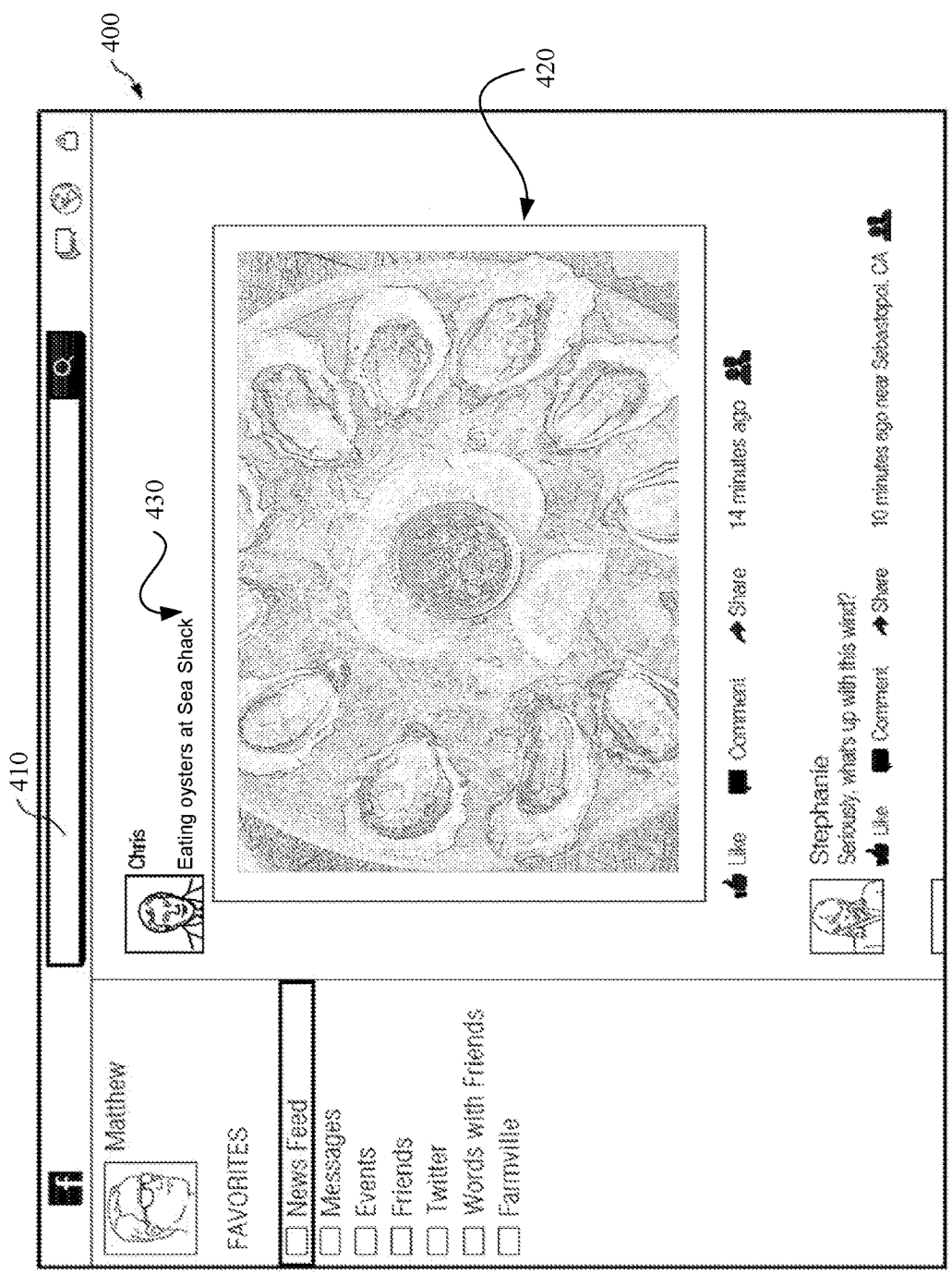
FIGS. 4A-4B illustrate an example query suggestions based on content objects viewed by a user in a current view session.
Figure 4B:
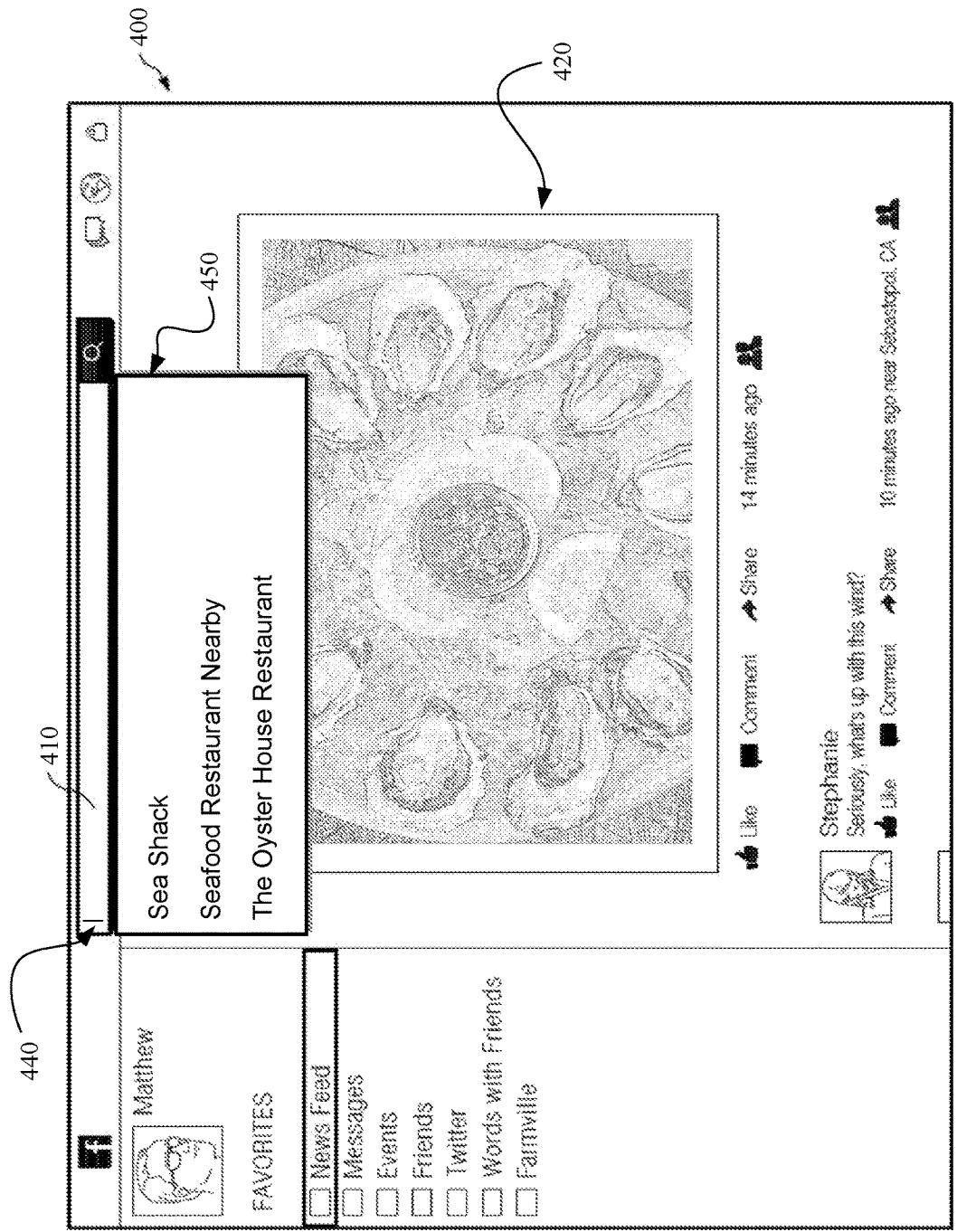

FIGS. 4A-4B illustrate an example query suggestions based on content objects viewed by a user in a current view session. In this example, Matthew, a first user, stays on his own newsfeed interface 400 and may initiate a search from this interface by clicking on the query field 410 on his client system 130. In a first part of an example scenario illustrated by FIG. 4A, Matthew may be viewing a video 420 posted by one of his friend Chris. The video is a short clip showing Chris and his family are eating dinner including a dish of oysters, and has text 430 saying "Eating oysters at Sea Shack". An embedded module on the client system 130 may send information that Matthew is viewing the "Eating oysters at Sea Shack" video posted by Chris to the social-networking system 160. Though Matthew may have viewed a few more posts on his newsfeed interface 400 before he views the video posted by Chris, we do not consider the other posts that Matthew may have viewed for the sake of brevity.

In a second part of an example scenario illustrated by FIG. 4B, Matthew just clicks on the query field 410. The cursor 440 may be displayed in the query filed 410 as an indication to the user that the query field 410 is ready to take user input in and as a location indication of the character input. As soon as Matthew clicks on the query field 410, one of the embedded modules operating the interface 400 on the client system 130 may communicate an indication that Matthew, the first user, accesses the query field towards the social-networking system 160. On receiving the indication, the social-networking system 160 may prepare query suggestions based at least on content objects Matthew viewed in the current view session, by determining the content objects, accessing terms associated with the content objects, and ranking the terms. The social-networking system 160 may send instructions for generating suggested-queries interface to the client system 130. The client system 130, in this example, may display a drop-box, as a suggested-queries interface, containing "Sea Shack", "Seafood Restaurant Nearby" and "The Oyster House Restaurant" as suggested queries. Although FIGS. 4A-4B illustrate displaying query suggestions based on content objects the first user viewed in the current view session in a particular manner, this disclosure contemplates displaying query suggestions based on content objects the first user viewed in the current view session in any suitable manner.

In particular embodiments, the social-networking system 160 may receive, from a client system 130 of a first user of an online social network, an indication that the first user has accessed a query field 410. A client system 130 may access the social-networking system 160 using a web browser 132, or a native application associated with the social-networking system 160 (e.g., a mobile social-networking application, a messaging application, another suitable application, or any combination thereof), either directly, via a network 110, or via a third-party system 170. The client system 130 may send the indication when the user accesses the query field 410, for example, by clicking on the query field 410. The social networking system 160 may interpret the indication as a sign that the user expressed intention to perform an online search and may prepare query suggestions that match the user's current interest. As an example and not by way of limitation, a querying user may click on the query field 410 while she is viewing her newsfeed on an online social network site using a web browser 132. As a response to the querying user's click on the query field 410, the client system 130 may make the querying field ready to accept user input and send an indication that the querying user is accessing the query field 410 to the social-networking system 160, for example, using a HTTP request. Although this disclosure describes receiving a particular indication that a querying user has accessed a query field 410 in a particular manner, this disclosure contemplates receiving any suitable indication that the querying user has accessed a query field 410 in any suitable manner.

In particular embodiments, the social-networking system 160 may determine one or more content objects viewed by the first user in a current view session. When the first user accesses an interface for viewing content objects (e.g., a newsfeed interface, a profile interface, a search-results interface) on a client system 130, the social-networking system 160 may transmit instructions for presenting a webpage for web browser 132 or an interface for mobile application (e.g., a social-networking application, a messaging application, etc.) displaying a plurality of content objects. The transmitted webpage or interface may include an embedded module (e.g., an embedded tracking module) to observe what content objects the first user has viewed in the current view session or what content object(s) the user is currently viewing. As the first user browses through the interface for viewing content objects, the embedded module may report such information to the social-networking system 160. Then, the social-networking system 160 may determine what content objects the first user is currently viewing on the client system 130. As an example and not by way of limitation, a user may access an online social network newsfeed using a web browser 132. The newsfeed webpage may use an embedded JAVASCRIPT module that observes what posts have been rendered and what part of a webpage a user is currently viewing. The embedded JAVASCRIPT module may communicate to the social-networking system 160 the collected information periodically, or whenever new information related to the user's view session becomes available, for example, whenever the user views a new post. The social-networking system 160 may determine the content objects the user is viewing based on the information sent by the embedded module. Although this disclosure describes determining the content objects viewed by a user in a current view session in a particular manner, this disclosure contemplates determining the content objects viewed by the user in the current view session in any suitable manner.

In particular embodiments, the indication that the first user has accessed the query field 410 is received at a present time, and the current view session is an active session, at the present time, between the client system 130 and the social-networking system 160 without having been terminated. In other words, the current view session is defined as an uninterrupted period between when the active session began between the client system 130 and the social-networking system 160 and the present time. The content objects the first user has recently viewed may reflect the first user's current interest. One way of refining the content objects recently viewed by a user in this disclosure is selecting the content objects viewed in a current view session. The social-networking system 160 may prepare query suggestions corresponding to terms associated with the content objects the first user has viewed in the current view session when the social-networking system 160 receives an indication that the first user has accessed the query field 410. Other ways of determining content objects recently viewed by the first user may be used. For example, the social-networking system 160 may prepare query suggestions based only on the content objects the first user is viewing when the first user accesses the query field 410 (i.e., query suggestions based just on the current view state, rather than the entire view session).

In particular embodiments, determining one or more content objects viewed by the first user may comprise receiving, from the client system 130, a request for a new interface associated with the online social network. A social-networking system 160 may provide query suggestions based on the content objects currently or recently viewed by a querying user when the querying user accesses the query field 410. For that feature, the social-networking system 160 may need to determine the content objects viewed by the first user. Receiving a request for a new interface associated with the online social network may be the first step the social-networking system 160 may take for determining the content objects viewed by the querying user. As an example and not by way of limitation, a querying user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. As another example and not by way of limitation, the querying user may click a link on a mobile social-networking application, and the mobile social-networking application may generate a HTTP request or a request of any proprietary protocol and communicate the request to server. As another example and not by way of limitation, the querying user may click a link on an application (e.g., a mobile messenger application) on a mobile device, and the link may trigger a mobile social-networking application on the same mobile device to generate a HTTP request or a request of any proprietary protocol and communicate the request to server. Although this disclosure describes receiving a particular request for a new interface in a particular manner, this disclosure contemplates receiving any suitable request for a new interface in any suitable manner.

In particular embodiments, determining one or more content objects viewed by the first user may comprise sending, to the client system 130 in response to the received request, instructions for generating the new interface, wherein the new interface comprises an embedded module that determines which content objects are being rendered and what part of the new interface the user is currently viewing. On receiving a request from a client system 130, the social-networking system 160 may incorporate an embedded module into the new interface and communicate the instructions for generating the new interface back to the client system 130. As an example and not by way of limitation, the server 162 may accept an HTTP request and communicate to the client system 130 one or more HTML files responsive to the HTTP request. The one or more HTML files also include an executable embedded script module that may determine which content objects are being rendered and what part of the new interface the querying user is currently viewing. In particular embodiments, the embedded module that determines which content objects are being rendered and what part of the new interface the user in currently viewing is a JAVASCRIPT module. In particular embodiments, the embedded modules are such as, for example and without limitation, those written in JAVA, MICROSOFT SILVERLIGHT, combinations of markup language and scripts such as AJAX (Asynchronous JAVASCRIPT and XML), and the like. Although this disclosure describes sending instructions for generating the new interface comprising a particular embedded module in a particular manner, this disclosure contemplates sending instructions for generating the new interface comprising any suitable embedded module in any suitable manner.

In particular embodiments, determining one or more content objects viewed by the first user may comprise receiving, from the embedded module, information regarding content objects that have been viewed by the first user. As the embedded module may observe which content objects are being rendered and what part of the new interface the first user is currently viewing, the embedded module may send information regarding content objects that have been viewed by the first user. The embedded module may send the information periodically to the social-networking system 160, or may send the information whenever new information becomes available to the social-networking system 160 (e.g., whenever a new content object is rendered on the client system 130). The social-networking system 160 may determine one or more content objects viewed by the first user in the current view session based on the information sent by the embedded module. As an example and not by way of limitation, a user may scroll down through his newsfeed and may be currently viewing a promotional video from the San Francisco 49ers football team with the text "Football season is about to start. Go 49ers!" A script module embedded in the newsfeed interface may send information that the user is viewing the promotional 49ers video to the social-networking system 160. The social-networking system 160 may determine that the user is viewing the promotional 49ers video. Although this disclosure describes receiving information regarding content objects viewed by a user in a particular manner, this disclosure contemplates receiving information regarding content objects viewed by the user in any suitable manner.

In particular embodiments, the social-networking system 160 may use an offline process that analyzes content objects and generates tags and metadata that describes the content and topics of the content objects. The social-networking system 160 may perform an analysis on a content object and generate tags and metadata associated with the content object when the content object is posted. As an example and not by way of limitation, referencing FIG. 4A, a user may post a video of the user eating a plate of oysters along with text "Eating oysters at Sea Shack." Throughout this document, the video of a user eating a plate of oysters with text "Eating oysters at Sea Shack" illustrated in FIG. 4A is referred to as the "oyster" video. The social-networking system 160 may perform an analysis on the posted video and generate the tags of, for example and without limitation, "oysters", "seafood", "restaurants", and "Sea Shack." The social-networking system 160 may also extract metadata including the author of the video, the location the video was taken (e.g., GPS coordinates, location tag information), the date the video was taken, other suitable metadata, or any combination thereof. Although this disclosure describes generating particular terms associated with a content object in a particular manner, this disclosure contemplates generating any suitable terms associated with a content object in any suitable manner.

In particular embodiments, the tags are generated by analyzing the text in the content with a natural-language processing algorithm. When a content object comprises text, the social-networking system 160 may analyze the text using one of the available natural-language processing algorithm to generate tags that have statistically significant correlation with the content object. In particular embodiments, the tags of the respective content object are generated by analyzing the image or video with an object-recognition algorithm when the respective content object is an image or video. When a content object comprises an image or video, the social-networking system 160 may analyze the image or video with an object-recognition algorithm to generate tags that describe the image or video content object. As an example and not by way of limitation, referencing FIG. 4A and continuing with the previous example, when the social-networking system 160 performs an analysis to generate tags on the "oyster" video, the social-networking system 160 may extract the text and analyze the frames of the video to generate the tags. The analysis may involve a natural-language processing algorithm for the extracted text and an algorithm for object-recognition in images for the frames of the video. Although this disclosure describes generating tags in a particular manner, this disclosure contemplates generating tags in any suitable manner.

In particular embodiments, the social-networking system 160 may extract terms from the content objects viewed by the user. The terms associated with the one or more content objects may comprises one or more of an author of the respective content object, a location associated with the respective content object, a date associated with the respective content object, text of the respective content object, tags providing descriptions and associated topics of the respective content object, comment or re-share text associated with the respective content object, visual concepts associated with the respective content object, other suitable terms associated with the content object, or any combination thereof. The social-networking system 160 may generate terms associated with a content object by generating tags and extracting metadata associated with the content object. The social-networking system 160 may extract metadata of a post including, for example and without limitation, an author of the content object, a location associated with the respective content object, text of the respective content object, the date and time associated with the content object, other suitable metadata, or any combination thereof. As an example and not by way of limitation, referencing FIG. 4A, the social-networking system 160 may generate tags of, for example and without limitation, "oysters", "seafood", "restaurants", and "Sea Shack" for the "oyster" video in the previous example. The social-networking system 160 may also extract metadata including the author of the video, the location the video was taken, the date the video was taken. The terms associated with the posted video comprise the generated tags and the extracted metadata. Although this disclosure describes particular kinds of terms associated with a content object, this disclosure contemplates any suitable kinds of terms associated with a content object.

In particular embodiments, the terms may be stored in a data store 164 in association with the respective content object when the terms are generated. The social-networking system 160 may store the generated tags and metadata as terms associated with the content object, for example and without limitation, in a post vertical 164 or database. As an example and not by way of limitation, the social-networking system 160 may store the generated tags and the extracted metadata as the terms associated with the post in a database table in the previous "oyster" video example illustrated in FIG. 4A. The identifier of the post may be stored as a foreign key in the database for each stored term. Although this disclosure describes storing terms associated with a content object in a particular manner, this disclosure contemplates storing terms associated with a content object in any suitable manner.

More information on generating tags on content objects may be found in U.S. patent application Ser. No. 13/167,701, filed 24 Jun. 2011, which is incorporated by reference.

In particular embodiments, the social-networking system 160 may access terms associated with one or more of the content objects. The social-networking system 160 may access the terms associated with the content objects viewed by the first user in the current view session to produce query suggestions. As discussed above, the social-networking system 160 may generate and store the terms in association with respective content object ahead of time (e.g., during an offline processing of the content objects). As an example and not by way of limitation, a querying user may click on the query field 410 while she may be viewing the "oyster" video in the example illustrated in FIG. 4A. Then, the social-networking system 160 may access the terms associated with the "oyster" video such as "oysters", "seafood", "restaurants", and "Sea Shack". As another example and not by way of limitation, a second querying user may scroll down through his newsfeed and view a promotional video from the San Francisco 49ers with the text "Football season is about to start. Go 49ers!." Throughout this document, the promotional video from the San Francisco 49ers with the text "Football season is about to start. Go 49ers!" is referred to as "football" video. The second querying user may then click on the query field 410. The social-networking system 160 may access the terms associated with the promotional 49ers video such as "Football", "NFL", "San Francisco 49ers", etc. Although this disclosure describes accessing terms associated with content objects viewed by a user in a current view session in a particular manner, this disclosure contemplates accessing terms associated with content objects viewed by the user in the current view session in any suitable manner.

In particular embodiments, the social-networking system 160 may filter the accessed terms associated with one or more of the content objects based on an object-type of the respective content object. The social-networking system 160 may apply various types of filters when the social-networking system 160 accesses the terms. Those filters may be configurable by the user. As an example and not by way of limitation, the social-networking system 160 may filter out the terms associated with advertisements while the social-networking system 160 is accessing the terms. As another example and not by way of limitation, the social-networking system 160 may access only terms associated with a particular object type (e.g., only terms associated with people). Although this disclosure describes filtering the accessed terms associated with one or more of the content objects in a particular manner, this disclosure contemplates filtering the accessed terms associated with one or more of the content objects in any suitable manner.

In particular embodiments, the social-networking system 160 may rank the terms based at least on a social-graph affinity of the first user with respect to the term. When the social-networking system 160 provides query suggestions, the social-networking system 160 may limit the number of query suggestions for various reasons: Screen real estate for query suggestions on the client system 130 may be limited. Also, the querying user may be overwhelmed if the social-networking system 160 provides too many query suggestions. A number of query suggestions corresponding to the terms accessed by the social-networking system 160 may exceed a number of query suggestions that can be provided to the client system 130. The social-networking system 160 may rank the terms to address this problem. The social-networking system 160 may be able to provide query suggestions more relevant to the first user's interest by performing the ranking process. If the total number of the prepared suggested queries is smaller than the number of the suggested queries that can be provided to the client system 130, ranking the terms may be skipped. The social-networking system 160 may use the social-graph affinity of the first user with respect to each accessed term as the first criterion for the ranking process. As an example and not by way of limitation, a user may have viewed both the "oyster" video and the "football" video in the previous examples. The user may have higher social-graph affinity with respect to football than with respect to oyster because the user may frequently post content related to football. Then, the social-networking system 160 may rank the terms associated with the "football" video higher than the terms associated with the "oyster" video. Although this disclosure describes ranking the terms in a particular manner, this disclosure contemplates ranking the terms in any suitable manner.

In particular embodiments, the social-networking system 160 may accessing a social graph comprising a plurality of nodes and a plurality of edges connecting the nodes, each of the edges between two of the nodes representing a single degree of separation between them, the nodes comprising: a first node corresponding to the first user, and a plurality of second nodes that each correspond to a concept or a second user associated with the online social network. The social-networking systems 160 may use the social-graph affinity of the first user with respect to the term as the first criterion while the social-networking system 160 is ranking the terms. The social-networking system 160 may need to access the social graph including a node representing the first user and nodes representing a concept or another user associated with the online social network to determine the social-graph affinity of the first user with respect to a concept or person represented by a node in the social graph.

In particular embodiments, the social-graph affinity of the first user with respect to the term may be based on a degree of separation between the first node and a second node associated with the term. The social-networking system 160 may measure or quantify social-graph affinity using an affinity coefficient, and the affinity coefficient may be based on the degree of separation between particular nodes in the social graph 200. As an example and not by way of limitation, the lower coefficient between a first node and a second node may represent the decreasing likelihood that the first user represented by the first node in the social graph 200 is interested in a person or concept represented by the second node in the social graph 200. Although this disclosure describes measuring the social-graph affinity of the first user with respect to a term in a particular manner, this disclosure contemplates measuring the social-graph affinity of the first user with respect to a term in any suitable manner.

In particular embodiments, ranking the terms may be based on popularity of the term in search queries on the online social network. The social-networking system 160 may also use local and/or global popularity of the terms as search queries on the online social network as additional criterion for ranking the terms. As an example and not by way of limitation, a querying user may use a first term as a search keyword often. Then, the social-networking system 160 may rank the first term higher than a second term when both the first term and the second term are associated with one or more content objects recently viewed by the querying user. As another example and not by way of limitation, a third term may be used popularly on the online social network by the other users over the last pre-determined time period, the social-networking system 160 may rank the third term higher than the second term when both the second and the third terms are associated with one or more content objects recently viewed by the querying user. Although this disclosure describes ranking the terms based on popularity of the terms in search queries in a particular manner, this disclosure contemplates ranking the terms based on popularity of the terms in search queries in any suitable manner.

In particular embodiments, ranking the terms may be based on one or more social signals associated with interactions by the first user with content objects viewed by the first user in the current view session. The social signals may include measures of user's interactions on the online social network with respect to particular content objects, such as, for example, a number of likes, reactions, comments, shares, other suitable interactions on online social networks, or any combination thereof. The social-networking system 160 may rank terms associated with a particular content object relatively higher based on the content object having more social signals (e.g., more likes, shares, etc.) than terms associated with content objects having fewer social signals. As an example and not by way of limitation, a querying user may have viewed two posts, post A and post B, before she clicks on the querying field 410. The post A got many likes and comments from the online social network users while the post B did not get any of those. The social-networking system 160 may rank terms associated with the post A higher than terms associated with the post B. The social-networking system 160 may interpret the social signals placed by the first user on a content object as an indication that the first user expressed her interest on the content object. The social-networking system 160 may rank terms associated with a particular content object relatively higher based on the content object getting the one of social signals from the first user. The social-networking system 160 may consider social signals that the first user has place over the threshold period of time, or the social-networking system 160 may consider only social signals associated with the first user in the current view session. As an example and not by way of limitation, a querying user may click a "like" icon associated with the "football" video in the previous examples, and the querying user may click on the query field 410. The social-networking system 160 may rank the terms associated with the "football" video higher than the other terms associated with the other content objects, viewed by the querying user, but did not get any of social signals from the querying user. As another example and not by way of limitation, a second querying user may have placed a "like" on a promotional post from a restaurant "Sea Shack" a few days ago. The second querying user may view the "oyster" video in the previous examples and may click on the query field 410. The social-networking system 160 may rank a term "Sea Shack", a tag associated with the "oyster" video as well as with the promotional post from restaurant "Sea Shack", high because the first user has recently shown interest in the restaurant by means of social signals. Although this disclosure describes ranking the terms based on social signals in a particular manner, this disclosure contemplates ranking the terms based on social signals in any suitable manner.

In particular embodiments, ranking the terms may be based on a term-matching confidence of the respective term to text of the respective content object. A term-matching confidence of a term to text of a content object is a level of confidence that the given term is actually intended text corresponding to the particular content object. The term-matching confidence may be measured by confidence score. The social-networking system 160 may rank a first term higher than a second term if the term-matching confidence of the first term to text of a content object is higher than the term-matching confidence of the second term to text of the content object and both the first term and the second term are associated with the content object. As an example and not by way of limitation, a querying user may view the "football" video when the querying user clicks on the query field 410. The social-networking system 160 may rank "San Francisco 49ers" higher than "NFL" if the term-matching confidence of "San Francisco 49ers" to the text of the "football" video is higher that that of "NFL." Although this disclosure describes ranking the terms based on term-matching confidence of terms in a particular manner, this disclosure contemplates ranking the terms based on term-matching confidence of terms in any suitable manner.

More information on term-matching confidence may be found in U.S. patent application Ser. No. 13/556,072, filed 23 Jul. 2012, and U.S. patent application Ser. No. 13/167,701, filed 24 Jun. 2011, which are incorporated by reference.

In particular embodiments, the social-networking system 160 may send, to the client system 130 for display, instructions for generating a suggested-queries interface responsive to the indication the first user has accessed the query field 410, the suggested-queries interface comprising one or more suggested queries corresponding to one or more terms having a ranking greater than a threshold rank, respectively. On receiving an indication that the first user has accessed a query field 410, the social-networking system 160 may prepare a set of suggested queries by determining the content objects viewed by the first user during the current view session, by accessing terms associated with the content objects, and by ranking the terms. The social-networking system 160 may send instructions for generating a suggested-queries interface that comprises a number of suggested queries corresponding to one or more terms having a ranking greater than a threshold rank. On receiving the instructions from the social-networking system 160, the client system 130 may display the suggested-queries interface close to the query field 410. As an example and not by way of limitation, the social-networking system 160 may send instructions to generate a suggested-queries interface to the client system 130. The client system 130 may display a drop-box close to the query field 410 filled with the suggested queries sent by the social-networking system 160. Although this disclosure describes sending instructions for generating a specific suggested-queries interface in a particular manner, this disclosure contemplates sending instructions for generating any suitable suggested-queries interface in any suitable manner.

In particular embodiments, the suggested-queries interface further comprises one or more context snippets corresponding to the one or more suggested queries, respectively, each context snippet comprising a reference to the content object associated with the term corresponding to the respective suggested query. The social-networking system 160 may further provide instructions to include context snippets for selected suggested queries within the suggested-queries interface. A context snippet may be a clickable link, or just a description providing further information about the corresponding query suggestion. As an example and not by way of limitation, a querying user may view a post with text "Go Warriors!", which was posted by Matthew, a friend of the querying user. The querying user may click on the query field 410 afterwards. The social-networking system 160 may provide additional descriptions on a suggested query "Warriors" with a context snippet. The querying user may get "Warriors—Matt posted about this" within the suggested-queries interface. If the querying user clicks on the "Warriors—Matt posted about this", the link may take the first user to the "Go Warriors!" post posted by Matthew. Although this disclosure describes sending instructions for generating context snippets in a particular manner, this disclosure contemplates sending instructions for generating context snippets in any suitable manner.

In particular embodiments, the social-networking system 160 may provide query suggestions as highlighted words in an interface. The query suggestions may correspond to the terms associated with the content objects the first user viewed in the current view session. On receiving a request for a new interface from a client system 130 of the first user, the social-networking system 160 may send instructions for generating an interface including highlighted words if the highlighted words match to one or more terms associated with the content objects the user viewed in the current view session. Clicking on the highlighted words may lead the first user to the search results associated with the highlighted words. As an example and not by way of limitation, a first user may view a post that includes a word "oyster" after the first user viewed the "oyster" video in the previous examples. The word "oyster" may be marked with a magnifying glass icon. The first user may click on the icon, and obtain search results associated with oysters. In particular embodiments, the social-networking system 160 may receive, from the client system of the first user, a request for a new interface. The social-networking system 160 may determine if one or more of the terms associated with the content objects viewed by the first user in the current view session appear in the new interface. The social-networking system 160 may modify, in response to the determination, the new interface to highlight the terms associated with the content objects viewed by the first user in the current view session, wherein interacting with one of the highlighted terms results in searching against the highlighted term. The social-networking system 160 may send, to the client system in response to the received request, the requested new interface. Although this disclosure describes treating words that correspond to the terms associated with content objects the user viewed in the current view session in a particular manner, this disclosure contemplates treating words that correspond to the terms associated with content objects the user viewed in the current view session in any suitable manner.

In particular embodiments, the social-networking system 160 may provide suggested queries based on the terms associated with content objects the user viewed in the current view session and a character string that the first user has typed in the query field 410. The social-networking system 160 may update the contents of the suggested queries interface after receiving a character string inputted by the first user. In particular embodiments, the social-networking system 160 may receive, from the client system 130, a character string inputted by the first user, wherein ranking the terms is further based on a quality of matching of the respective term to the character string. The social-networking system 160 may perform the query suggestion generation process as described before after receiving a character string inputted by the first user. The social-networking system 160 may further apply the quality of matching of the respective term to the character string as a criterion when the social-networking system 160 performs ranking the terms. As an example and not by way of limitation, the social-networking system 160 may provide query suggestions to a querying user based on terms associated with the "oyster" video because the querying user has viewed the "oyster" video in the current view session. If the social-networking system 160 receives a character string "oys", the social-networking system 160 ranks "oyster" higher than "Sea Shack" because "Sea Shack" does not contain "oys". Although this disclosure describes ranking the terms based on a quality of matching of the respective term to the inputted character string in a particular manner, this disclosure contemplates ranking the terms based on a quality of matching of the respective term to the inputted character string in any suitable manner.

In particular embodiments, the social-networking system 160 may receive, from the client system, a character string inputted by the first user, wherein accessing terms associated with one or more of the content objects comprises accessing terms matching the character string. On receiving a character string inputted by the first user, the social-networking system 160 may filter out the terms not matching the character string when the social-networking system 160 accesses the terms associated with the content objects. As an example and not by way of limitation, the social-networking system 160 may provide query suggestions to a querying user based on the terms associated with the "oyster" video because the querying user has viewed the "oyster" video in the current view session. If the social-networking system 160 receives a character string "oys" as input from the querying user, the social-networking system 160 may filter out terms that do not contain "oys", for example "Sea Shack" and "Restaurants". Although this disclosure describes filtering terms based on user input in a particular manner, this disclosure contemplates filtering terms based on user input in any suitable manner.

Figure 5:
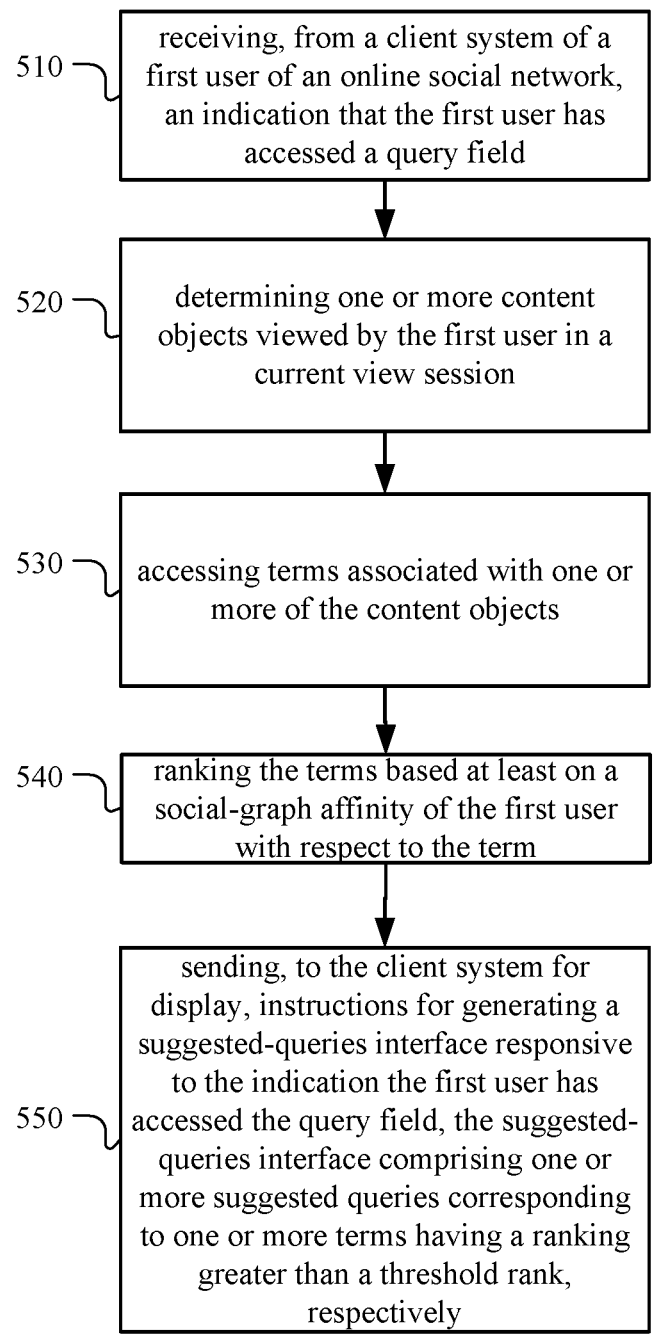
FIG. 5 illustrates an example method for providing query suggestions without getting user input based on content objects a user viewed in a current view session.

FIG. 5 illustrates an example method 500 for providing query suggestions without getting user input based on content objects a user viewed in a current view session. The method may begin at step 510, where the social-networking system 160 may receive, from a client system 130 of a first user of an online social network, an indication that the first user has accessed a query field 410. At step 520, the social-networking system 160 may determine one or more content objects viewed by the first user in a current view session. At step 530, the social-networking system 160 may access terms associated with one or more of the content objects. At step 540, the social-networking system 160 may rank the terms based at least on a social-graph affinity of the first user with respect to the term. At step 550, the social-networking system 160 may send, to the client system for display, instructions for generating a suggested-queries interface responsive to the indication the first user has accessed the query field 410, the suggested-queries interface comprising one or more suggested queries corresponding to one or more terms having a ranking greater than a threshold rank, respectively. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for providing query suggestions without getting user input based on content objects a user viewed in a current view session including the particular steps of the method of FIG. 5, this disclosure contemplates any suitable method for providing query suggestions without getting user input based on content objects a user viewed in a current view session including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

In connection with search queries query suggestions, particular embodiments may utilize one or more systems, components, elements, functions, methods, operations, or steps disclosed in U.S. patent application Ser. No. 14/052,536, filed 11 Oct. 2013, U.S. patent application Ser. No. 14/470,607, filed 27 Aug. 2014, U.S. patent application Ser. No. 14/561,418, filed 12 May 2014, and U.S. patent application Ser. No. 15/251,909, filed 30 Aug. 2016, which are incorporated by reference.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 6:
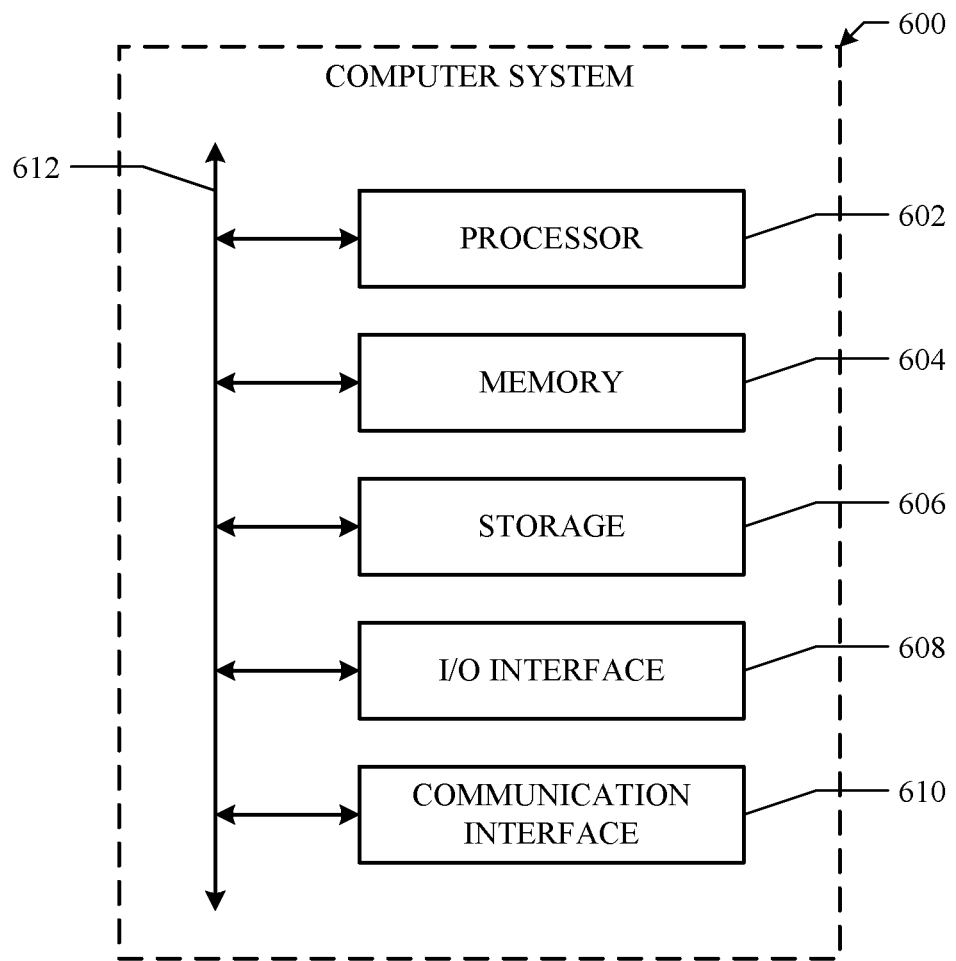
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
receiving, from a client system of a first user, an indication that one or more content objects have been rendered for longer than a pre-determined duration of time in a current view state of a view session of the client system, wherein the one or more content objects are a subset of a plurality of content objects rendered during the view session;
receiving, from the client system, an indication that the first user has accessed a query field;
determining one or more of the content objects viewed by the first user in a current view state based on the received indication that the one or more content objects have been rendered for longer than the pre-determined duration of time in the current view state;
accessing terms associated with one or more of the determined content objects; and
sending, to the client system for display, instructions for generating a suggested-queries interface responsive to the indication the first user has accessed the query field, the suggested-queries interface comprising one or more suggested queries corresponding to one or more terms associated with the one or more of the determined content objects viewed by the first user in the current view state.

2. The method of claim 1, wherein the indication that the first user has accessed the query field is received at a present time, and wherein the view session is an active session, at the present time, between the client system and the computing device without having been terminated.

3. The method of claim 1, wherein the terms associated with the one or more determined content objects comprises one or more of:
an author of the respective content object;
a location associated with the respective content object;
text of the respective content object;
tags providing descriptions and associated topics of the respective content object;
comment or re-share text associated with the respective content object; or
visual concepts associated with the respective content object.

4. The method of claim 3, wherein the tags are generated by analyzing the text in the content with a natural-language processing algorithm.

5. The method of claim 3, wherein the respective content object is an image or video, and wherein the tags of the respective content object are generated by analyzing the image or video with an object-recognition algorithm.

6. The method of claim 1, wherein the terms are stored in a data store in association with the respective content object when the terms are generated.

7. The method of claim 1, wherein receiving an indication that one or more content objects have been rendered for longer than a pre-determined duration of time in a current view state of a view session of the client system comprises:
receiving, from the client system, a request for a new interface;
sending, to the client system in response to the received request, instructions for generating the new interface, wherein the new interface comprises an embedded module that determines which content objects are being rendered and what part of the new interface the user is currently viewing; and
receiving, from the embedded module, information regarding content objects that have been viewed by the first user, wherein the information indicates that one or more content objects have been rendered for longer than the pre-determined duration of time in a part of the new interface.

8. The method of claim 7, wherein the embedded module is a JAVASCRIPT module.

9. The method of claim 1, further comprising filtering the accessed terms associated with one or more of the determined content objects based on an object-type of the respective content object.

10. The method of claim 1, wherein the suggested-queries interface further comprises one or more context snippets corresponding to the one or more suggested queries, respectively, each context snippet comprising a reference to the content object associated with the term corresponding to the respective suggested query.

11. The method of claim 1, further comprising:
receiving, from the client system of the first user, a request for a new interface;
determining if one or more of the terms associated with the content objects viewed by the first user in the current view session appear in the new interface;
modifying, in response to the determination, the new interface to highlight the terms associated with the content objects viewed by the first user in the current view session, wherein interacting with one of the highlighted terms results in searching against the highlighted term; and
sending, to the client system in response to the received request, the requested new interface.

12. The method of claim 1, further comprising receiving, from the client system, a character string inputted by the first user, wherein accessing terms associated with one or more of the determined content objects comprises accessing terms matching the character string.

13. The method of claim 1, further comprising:
ranking the terms based at least on a social-graph affinity of the first user with respect to the term, wherein the suggested queries are presented in the suggested-queries interface in ranked order based on the respective rankings of the terms contained in the suggested queries.

14. The method of claim 13, further comprising:
accessing a social graph comprising a plurality of nodes and a plurality of edges connecting the nodes, each of the edges between two of the nodes representing a single degree of separation between them, the nodes comprising:
a first node corresponding to the first user; and
a plurality of second nodes that each correspond to a concept or a second user.

15. The method of claim 14, wherein the social-graph affinity of the first user with respect to the term is based on a degree of separation between the first node and a second node associated with the term.

16. The method of claim 13, wherein ranking the terms is further based on popularity of the term in search queries.

17. The method of claim 13, wherein ranking the terms is further based on social signals associated with interactions by the first user with content objects viewed by the first user in the view session.

18. The method of claim 13, wherein ranking the terms is further based on a term-matching confidence of the respective term to text of the respective content object.

19. The method of claim 13, further comprising receiving, from the client system, a character string inputted by the first user, wherein ranking the terms is further based on a quality of matching of the respective term to the character string.

20. One or more computer-readable non-transitory storage media embodying software that is operable when executed to:
receive, from a client system of a first user, an indication that one or more content objects have been rendered for longer than a pre-determined duration of time in a current view state of a view session of the client system, wherein the one or more content objects are a subset of a plurality of content objects rendered during the view session;
receive, from the client system, an indication that the first user has accessed a query field;
determine one or more of the content objects viewed by the first user in a current view state based on the received indication that the one or more content objects have been rendered for longer than the pre-determined duration of time in the current view state;
access terms associated with one or more of the determined content objects; and
send, to the client system for display, instructions for generating a suggested-queries interface responsive to the indication the first user has accessed the query field, the suggested-queries interface comprising one or more suggested queries corresponding to one or more terms associated with the one or more of the determined content objects viewed by the first user in the current view state.

21. A system comprising: one or more processors; and a non-transitory memory coupled to the processors comprising instructions executable by the processors, the processors operable when executing the instructions to:
receive, from a client system of a first user, an indication that one or more content objects have been rendered for longer than a pre-determined duration of time in a current view state of a view session of the client system, wherein the one or more content objects are a subset of a plurality of content objects rendered during the view session;
receive, from the client system, an indication that the first user has accessed a query field;
determine one or more of the content objects viewed by the first user in a current view state based on the received indication that the one or more content objects have been rendered for longer than the pre-determined duration of time in the current view state,
access terms associated with one or more of the determined content objects; and
send, to the client system for display, instructions for generating a suggested-queries interface responsive to the indication the first user has accessed the query field, the suggested-queries interface comprising one or more suggested queries corresponding to one or more terms associated with the one or more of the determined content objects viewed by the first user in the current view state.

* * * * *